(12) United States Patent
Humphrey et al.

(10) Patent No.: US 8,310,100 B2
(45) Date of Patent: Nov. 13, 2012

(54) SYSTEM AND METHOD FOR A REDUNDANT POWER SOLUTION

(75) Inventors: Daniel Humphrey, Houston, TX (US); Mohamed Amin Bemat, Cypress, TX (US); David Paul Mohr, Spring, TX (US); Mark Isagani Bello Rivera, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 260 days.

(21) Appl. No.: 12/762,035

(22) Filed: Apr. 16, 2010

(65) Prior Publication Data

US 2011/0254374 A1    Oct. 20, 2011

(51) Int. Cl.
*H02J 1/00* (2006.01)
*H02J 3/00* (2006.01)
(52) U.S. Cl. .......................................................... 307/80
(58) Field of Classification Search ............... 307/45, 307/64, 80, 82, 86
See application file for complete search history.

(56) References Cited

U.S. PATENT DOCUMENTS

| | | | |
|---|---|---|---|
| 7,450,383 | B1 | 11/2008 | Li et al. |
| 7,586,211 | B2 | 9/2009 | Loffink et al. |
| 7,612,469 | B2 | 11/2009 | Kuo |
| 7,629,708 | B1 | 12/2009 | Meyers et al. |
| 7,679,217 | B2 | 3/2010 | Dishman et al. |
| 7,898,111 | B1 * | 3/2011 | Pistel ................................ 307/82 |
| 2004/0003306 | A1 * | 1/2004 | Oomori ........................... 713/300 |
| 2009/0072623 | A1 * | 3/2009 | Liao ................................... 307/65 |

* cited by examiner

*Primary Examiner* — Carlos Amaya

(57) ABSTRACT

A redundant power solution system, including at least a first and second input module, each configured for receiving input power, an output converter, wherein a first output line from the first input module and a second output line from the second module both feed into the output converter, and a control mechanism associated with the first and second input modules, wherein the control mechanism monitors the input power received by the first and second input modules and dynamically selects at least one of the first and second input modules to feed power into the output converter.

19 Claims, 3 Drawing Sheets

SYSTEM AND METHOD FOR A REDUNDANT POWER SOLUTION

BACKGROUND OF THE INVENTION

The present invention relates generally to AC-DC converters, and more specifically to AC-DC converters used in computer servers and which provide redundancy.

A power supply refers to a source of electrical power wherein electrical energy is supplied to an output load or a group of output loads. Power converters provide for conversion of one form of electrical power to another desired form and voltage. One common example is an AC-DC converter, which converts an AC line voltage to a well-regulated lower-voltage DC current commonly used for electronic devices. Low voltage, low power DC power supply units are commonly integrated with the devices they supply power, such as computers and household electronics.

Power supplies also commonly employ some technique of redundancy to minimize the chances of a system or component losing power. Redundant power supplies are essentially power systems that include two or more units within it, each of which is capable of powering the entire system by itself. Therefore, if for some reason there is a failure in one of the units, the other one can seamlessly take over to prevent the loss of power to the system. In some configurations, one can even replace the damaged unit without powering down the machine. This is commonly referred to as hot swapping, and is commonly used with computer servers or other machines that are used by a large number of people.

Traditional AC-DC converters also use an input rectifier to convert AC power to DC power and also to employ power factor correction (i.e., shape input current to match voltage to provide an improved power factor). Further, that rectified voltage is then converted to a lower voltage output, which actually runs the server.

DETAILED DESCRIPTION

The present invention provides a power solution that provides benefits over the traditional two-converter redundant AC to DC power supply described above. In one embodiment of the present invention, the two-converter power supply is replaced with redundant single converter AC to DC power factor correcting power supplies (i.e., an input module) which powers a common output converter. In some embodiments, the redundant input modules are run exclusive of one another to allow use of non-isolated converter topologies.

Figure 1:
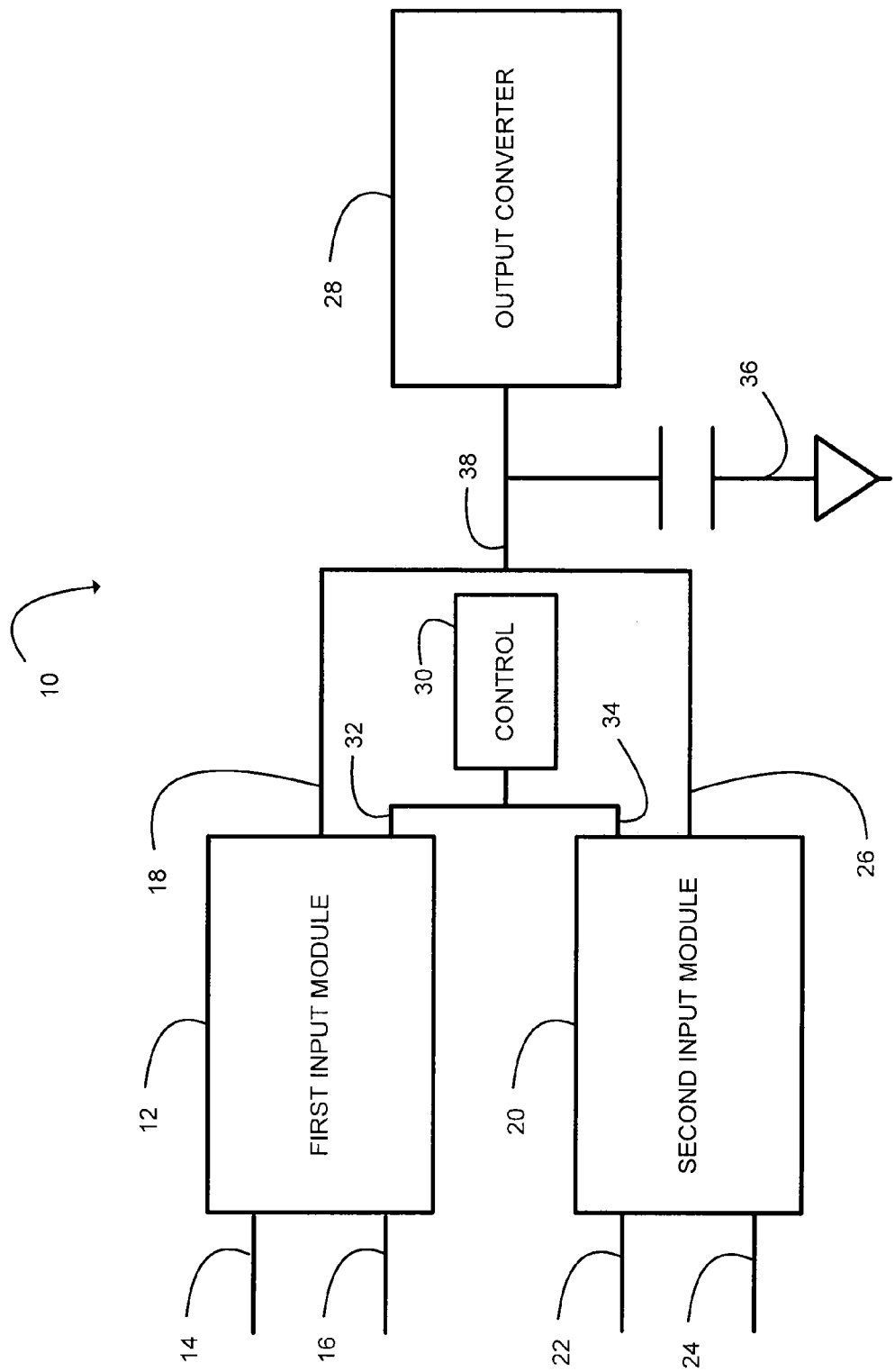
FIG. 1 is a schematic diagram illustrating an embodiment of a power solution system of the present invention.

Referring now to FIG. 1, an example embodiment redundant power solution system 10 is shown. Included in the power solution system 10 is a first input module 12 having input lines 14, 16, and output line 18. Similarly, a second input module 20 has input lines 22, 24, and output line 26. The two input modules 12, 20 are each configured for receiving input power over the input lines 14, 16, 22, 24. Notably, the power solution system is not limited to two input modules, but instead can include two or more input modules. Further, throughout this application, any reference to "a," "an," or "the" should be interpreted to mean "at least one," unless otherwise specified.

Figure 2:
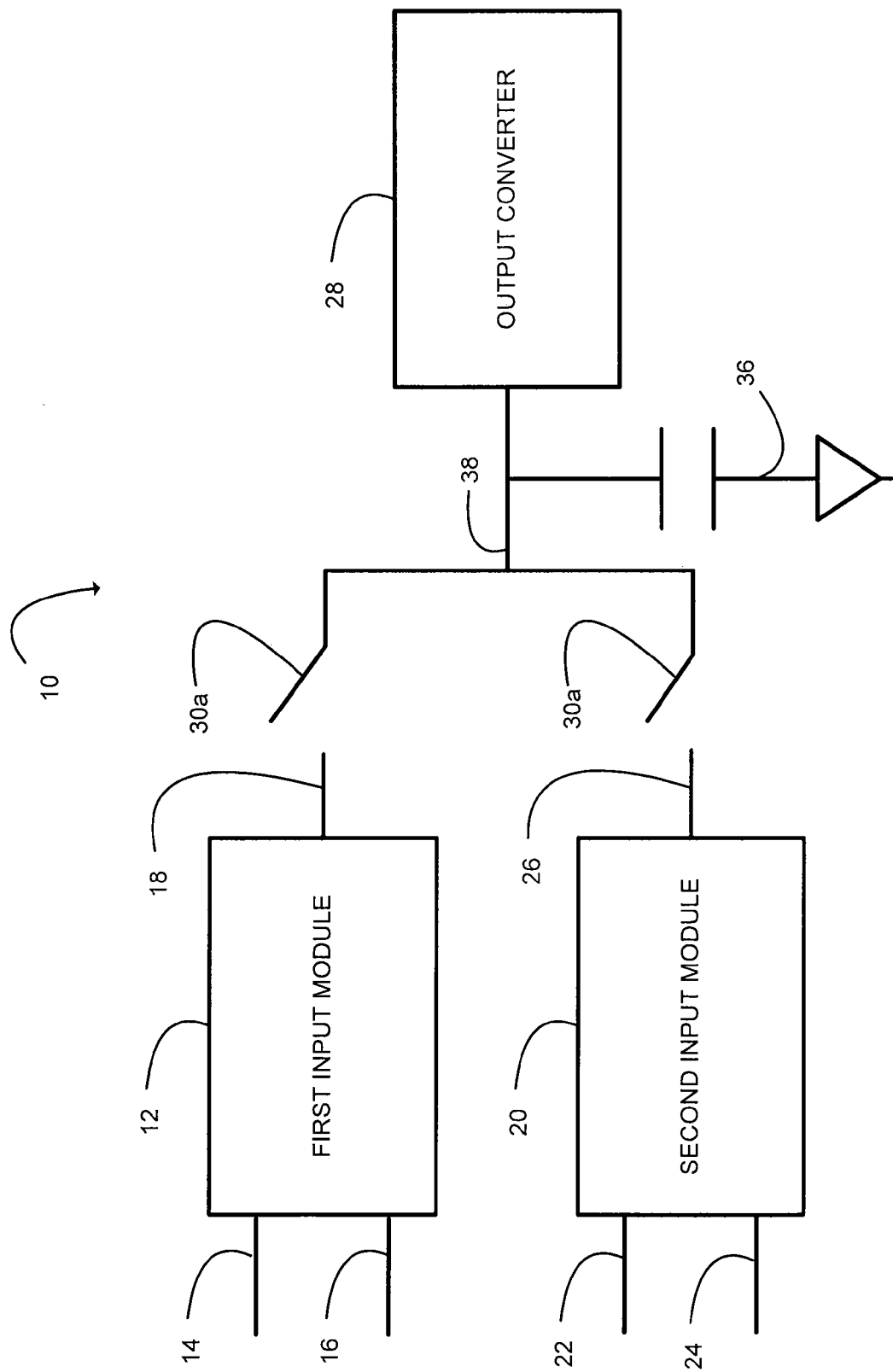
FIG. 2 is a schematic diagram illustrating an alternate embodiment of a power solution system of the present invention.

Further included in the power solution system is an output converter 28. The output lines 18, 26 of the input modules 12, 20 are merged and feed into the output converter 28. A control mechanism 30 associated with the input modules 12, 20 (preferably through additional output lines 32, 34 from the input modules 12, 20) monitors the input power received by the input modules and dynamically selects at least one of the input modules to feed power into the output converter 28. Notably, in another example embodiment, the input modules 12, 20 are controlled using switches 30a on each output line 18, 26 (See FIG. 2).

While multiple output converters 28 can be used, only a single output converter is used in the described embodiment. The output converter 28 can also be composed of either parallel redundant or non-redundant converters. Redundant converters employ such known redundancy techniques that ensure system availability in the event of component failure. The level of resilience is referred to as active/passive or standby as backup components do not actively participate within the system during normal operation. The extent of the backup (i.e., the number of backup components provided) can be altered depending on the system requirements. As such, it is common to employ N+1 or N+N redundancy techniques. N-redundancy (i.e., non-redundancy) means the system has enough converters to provide the required power. For example, if the system has up to a 600 watt load and a single 600 watt converter, the system employs N-redundancy. Indeed, the system can run fine unless the single converter fails. In that case, the system would have insufficient power and would be unable to operate. N+1 redundancy allows for failure of one converter while still allowing the system to run. For example, if the system having up to a 600 watt load has two 600 watt converters (or three 300 watt converters), even with one of the converters failing, the system would still have sufficient power and could continue operation. If N+1 operation were employed in the present invention, the described system would include multiple input and output modules. Notably, redundancy can exceed N+1 (i.e., N+N), whereby the system allows for multiple power supply (including input power) failures while still providing sufficient power to the system.

The output converter 28 can also be either an isolated or a non-isolated converter. Isolated converters refer to converters that have an electrical barrier between the input and output of the converter, where as non-isolated converters have no barriers. As such, isolation describes the electrical separation between the input and output of a converter. An isolated converter uses a transformer to eliminate the DC path between its input and output. Non-isolated DC-DC converter designs usually employ isolated converters specifically intended for that purpose. Finally, an energy storage component 36 is positioned to operationally connect to lines 18, 26 (where they merge to form a single lead 38 to the output converter 28).

Figure 3:
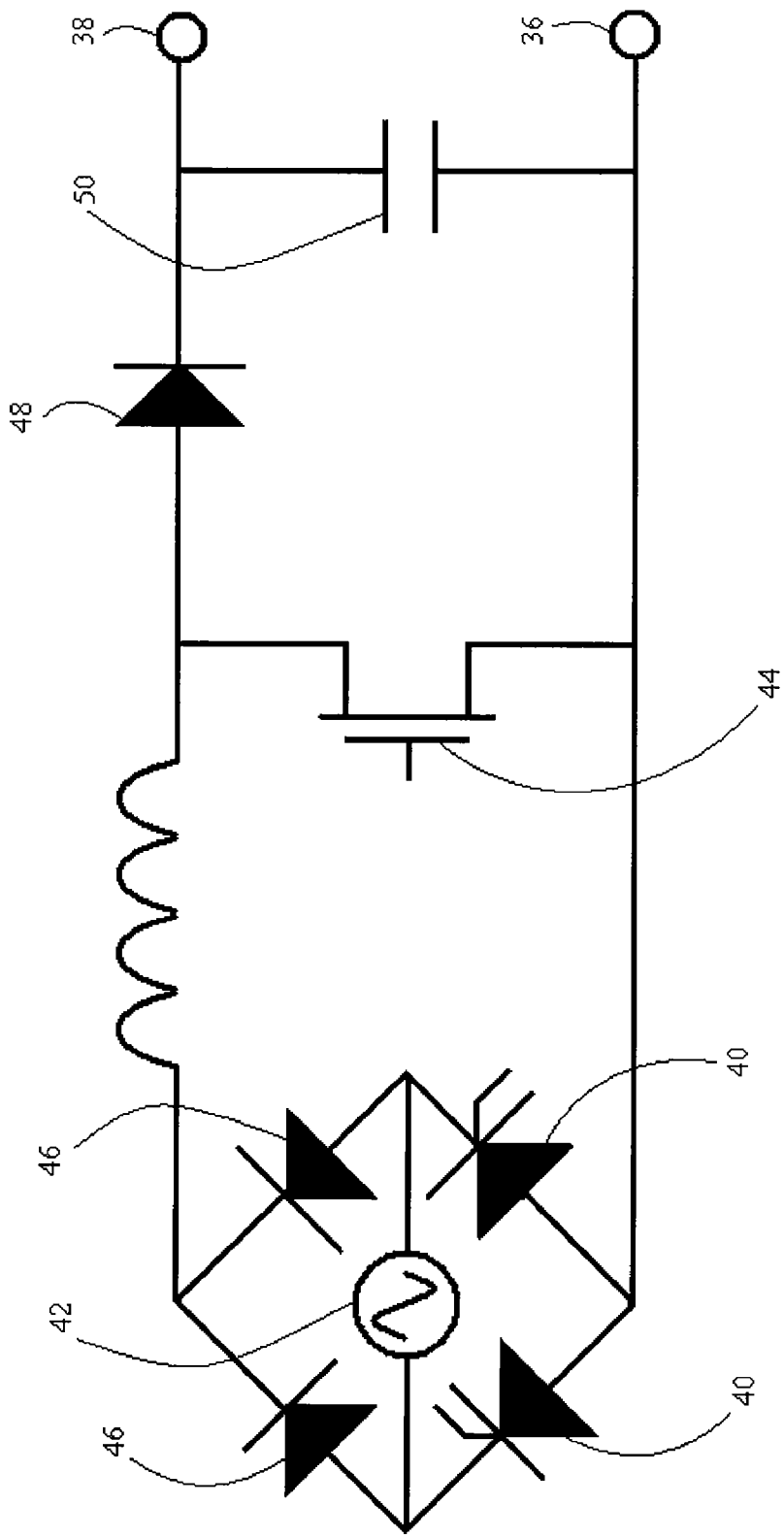
FIG. 3 is a circuit diagram of an embodiment of a power solution system of the present invention.

Operation of an embodiment of the present invention will now be described with respect to FIG. 3, which depicts a circuit diagram showing an example operation within the control circuit 30. Included in the circuit are two silicon controlled rectifiers (SCRs) 40, which provide for forward biasing as associated device. Notably, SCRs will not conduct until a current is injected into it. However, as soon as a current is injected into the SCR 40, the SCR will continue to conduct current until the current traversing through it reduces to zero.

Traditional AC sources 42 provide zero crossings twice per cycle. For example, in a 60 hertz signal, there are 120 crossings per second with each zero crossing causing the device to turn off. As such, with a pair of SCRs 40 as shown in FIG. 3, they can be operated in conjunction such that one SCR gets turned on and is let run. Then, when the first SCR turns off, the other SCR 40 turns on. This process is then repeated providing alternating operation of the two SCRs 40. As described in greater detail below, a controller provides for turning on an SCR and letting the converter operating for the entire half cycle and then turning on the next SCR, thereby cycling through the parallel converters. Failure to utilize this technique could potentially lead to current entering from a diode 46 and leaving through an SCR 40 (in a parallel module). Notably, this issue does not exist for a single input module, but instead only for parallel input modules. Yet another technique provides for monitoring the output converter 28 to determine if a fault occurs. If a fault does occur, another one of the input modules 12, 20 is selected to provide power to the output converter.

Further included in the circuit is a gate 44. In the example embodiment, the gate 44 is implemented using a MOSFET. When a positive voltage is applied to a bottom piece of the gate, the gate allows electrons to flow through. As such, when the gate is on, energy flows such that the current enters the MOSFET through the drain and exists through the source. Also, when the MOSFET is off, the current will still move through SCRs 40. However, the current will move though the diode 48 and come back through the capacitor 50 or the load connected to points 36 and 38. As described above, the circuit is associated with a controller 30 (e.g., micro or analog) to control operation of the circuit (FIG. 1). The controller 30 is configured such that it monitors input power of the input modules 12, 20 and dynamically controls which input module is able to provide power at any given time. As noted above, this control can be established for example, by using SCRs 40. As such, the controller 30 dynamically manages the SCRs in each input module 12, 20 to control which input power source provides current, as well as where the current returns from. The controller 30 is also configured to dynamically adjust load sharing between two input modules. Such sharing can therefore be done on-the-fly to assist with load balancing across multiple servers and power feeds. Further in the example embodiment shown, control logic and energy storage 36 is located at the common output 38 and is sized accordingly such that it provides the necessary holdup energy for the common output 38. Notably, the embodiment described above can be extended to N modules running in parallel to provide more efficient conversion of AC to DC power.

With the embodiment described above, the need for two output conversion stages for redundant power supplies in order to establish the required availability for various uptime standards (as required by the prior art) is eliminated. In the present embodiment, the majority of conversions are performed at the input conversion side (rather than the output conversion side as with the prior art). Further, using a common output conversion stage improves efficiency, reduces costs, and saves space. Notably, real estate within a server which is a valuable resource.

In addition, servers typically have removable power supplies (i.e., in which the entire power supply is removed and replaced). In the described embodiment, the input converters are easily swappable on their own, while the output converter is essentially integrated into the server. Notably, the output converter could be removed, but the server would likely need to be taken offline. However, in most instances, it should only be the input converter 12, 20 which needs to be swapped. Notably, while the example embodiments have been described as being installed within a server, the present invention is not so limited and could be installed and/or associated with any device or component needing a power source.

While several particular embodiments of a method and system for removing a tunnel between portal points have been described herein, it will be appreciated by those skilled in the art that changes and modifications may be made thereto without departing from the invention in its broader aspects and as set forth in the following claims.

What is claimed is:

1. A redundant power solution system, comprising: at least a first and second input module, each configured for receiving input power; an output converter, wherein a first output line from said first input module and a second output line from said second module both feed into said output converter; and a control mechanism associated with said first and second input modules, wherein said control mechanism monitors the input power received by said first and second input modules and dynamically selects at least one of said first and second input modules to feed power into said output converter; and a first and second silicon controlled rectifier associated with said control mechanism, wherein said control mechanism provides for turning on the first silicon controlled rectifier for an entire half alternating current cycle and turning off the second silicon controlled rectifier for the entire half alternating current cycle to provide switching between said first and second input modules.

2. The power solution system of claim 1 wherein said system includes one output converter.

3. The power solution system of claim 1 wherein said output converter is a non-redundant converter.

4. The power solution system of claim 1 wherein said output converter is a redundant converter, wherein at least two redundant converters are running in parallel.

5. The power solution system of claim 4 wherein said output converter employs one of N, N+1, or N+N type redundancy techniques.

6. The power solution system of claim 1 wherein said output converter is one of an isolated converter or a non-isolated converter.

7. The power solution system of claim 1 wherein one of said input modules is one of an isolated or a non-isolated module.

8. The power solution system of claim 1 wherein said control mechanism includes a control switch on each output line and a control circuitry to control said control switches.

9. The power solution system of claim 1 wherein said control mechanism provides load sharing between said at least two input modules.

10. The power solution system of claim 1 wherein said first and said second output lines merge into a common output line, which feeds into said output converter.

11. The power solution system of claim 1 further comprising an energy storage device operationally connected to said common output line.

12. The power solution system of claim 1 wherein power received by said at least two input modules is AC power and power output by said output converter is DC power.

13. The power solution system of claim 1 wherein said system is installed in a server.

14. A method of channeling power, comprising: receiving input power on at least two input modules; monitoring said input power using a control mechanism associated with said at least two input modules; utilizing the control mechanism for providing for turning on a first silicon controlled rectifier for an entire half alternating current cycle and turning off a second silicon controlled rectifier for the entire half alternating current cycle to provide switching between said at least two input modules; and dynamically selecting at least one of said input modules to provide power to an output converter according to the control mechanism for the first and second silicon controlled rectifier.

15. The method of claim 14 further comprising the steps of:
monitoring the system to determine if a fault occurs within one of said input modules; and
if a fault occurs, selecting another one of said input modules to provide power to the output converter.

16. The method of claim 14 wherein said selecting one of said input modules is performed by biasing a silicon controlled rectifier associated with the one of said input modules.

17. The method of claim 14 wherein said output converter is a redundant converter.

18. The method of claim 14 wherein said at least two input modules and said output converter are installed in a server.

19. A redundant power solution system, comprising: two input modules configured for receiving input power; one output converter, wherein a first output line from a first input module and a second output line from a second module both feed into said output converter; a first and second silicon controlled rectifier associated with a control mechanism, wherein said control mechanism provides for turning on the first silicon controlled rectifier for an entire half alternating current cycle and turning off the second silicon controlled rectifier for the entire half alternating current cycle to provide switching between said two input modules; and wherein said control mechanism is associated with said two input modules and monitors the input power received by said two input modules and dynamically selects at least one of said two input modules to feed power into said output converter, and wherein said control mechanism monitors said system to determine if a fault occurs within one of said input modules and if said control monitor detects a fault, said control mechanism selects the other said input module to feed power into said output converter.

* * * * *